United States Patent
Lemarchand et al.

(10) Patent No.: US 10,112,514 B2
(45) Date of Patent: Oct. 30, 2018

(54) PIPING FOR A MOTOR VEHICLE COVER

(71) Applicant: Faurecia Sieges D'Automobile, Nanterre (FR)

(72) Inventors: Robert Lemarchand, Champigny-sur-Marne (FR); Pauline Rafstedt, Leudeville (FR); Cédric Caravano, Ponthévrard (FR)

(73) Assignee: Faurecia Sieges D'Automobile, Nanterre (FR)

( * ) Notice: Subject to any disclaimer, the term of this patent is extended or adjusted under 35 U.S.C. 154(b) by 191 days.

(21) Appl. No.: 14/733,561

(22) Filed: Jun. 8, 2015

(65) Prior Publication Data

US 2015/0375654 A1 Dec. 31, 2015

(30) Foreign Application Priority Data

Jun. 20, 2014 (FR) .................................... 14 55703

(51) Int. Cl.
*B60N 2/58* (2006.01)
*D05B 15/00* (2006.01)
*D05B 35/06* (2006.01)

(52) U.S. Cl.
CPC ......... *B60N 2/5883* (2013.01); *B60N 2/5891* (2013.01); *D05B 15/00* (2013.01); *D05B 35/06* (2013.01)

(58) Field of Classification Search
CPC ................ B60N 2/5883; B60N 2/5891; B60N 2002/5808; A47C 31/02
See application file for complete search history.

(56) References Cited

U.S. PATENT DOCUMENTS

| | | | | |
|---|---|---|---|---|
| 2,823,736 A * | 2/1958 | Brody | .................. | A47C 31/113 5/482 |
| 3,649,974 A * | 3/1972 | Baruth | ................. | B60N 2/5883 297/452.59 |
| 3,671,984 A * | 6/1972 | Ambrose | ................. | B68G 7/10 297/452.16 |
| 3,818,521 A | 6/1974 | Richards, Jr. | | |
| 3,940,812 A * | 3/1976 | DiForti | .................... | D06H 5/00 112/418 |
| 4,650,251 A * | 3/1987 | Shimada | ................ | A47C 31/00 156/73.1 |
| 4,987,666 A * | 1/1991 | Smith | ...................... | A47C 7/18 264/45.1 |
| 5,324,462 A * | 6/1994 | Rohn | .................... | B29C 44/143 264/278 |

(Continued)

FOREIGN PATENT DOCUMENTS

DE 20203264 U1 8/2002
JP H10309221 A 11/1998

OTHER PUBLICATIONS

"French Search Report," dated Feb. 11, 2015, issued in counterpart French Patent Application No. FR 14/55703.

*Primary Examiner* — David R Dunn
*Assistant Examiner* — Tania Abraham
(74) *Attorney, Agent, or Firm* — Kaplan Breyer Schwarz, LLP

(57) ABSTRACT

A motor vehicle seat cover including, at the level of an assembly between first and second parts, a piping assembled to said parts and having at least one first section above the cover and at least one second section masked by the cover.

15 Claims, 3 Drawing Sheets

(56) References Cited

U.S. PATENT DOCUMENTS

| | | | | |
|---|---|---|---|---|
| 5,893,579 A * | 4/1999 | Kimura | ............... | B60N 2/5825 |
| | | | | 280/728.3 |
| 7,278,363 B2 * | 10/2007 | Wieczorek | ........... | B60N 2/5883 |
| | | | | 112/139 |
| 8,074,313 B2 * | 12/2011 | Marcangelo | ......... | A47C 21/022 |
| | | | | 5/690 |

* cited by examiner

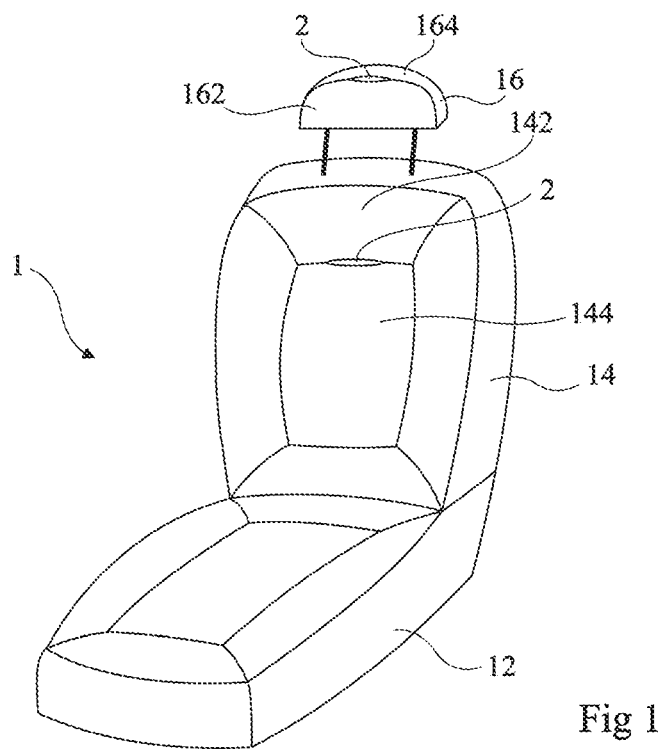
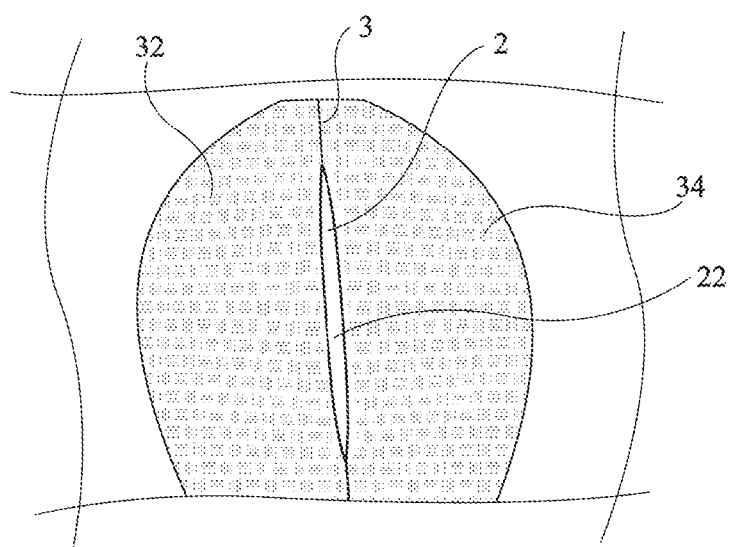

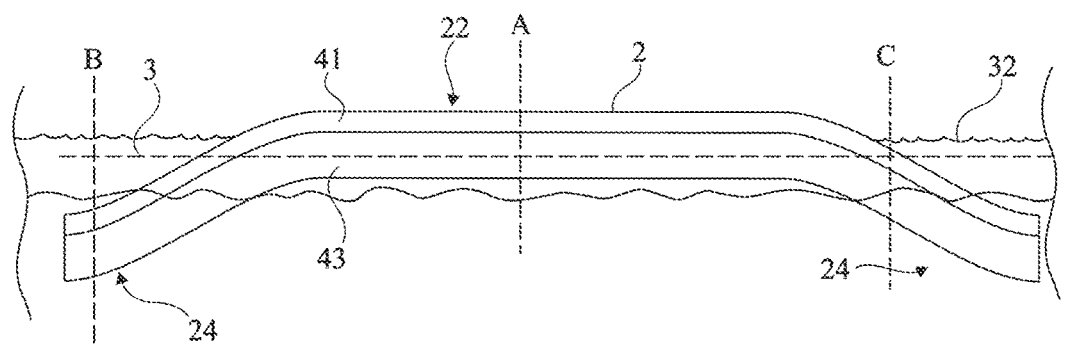
Fig 3
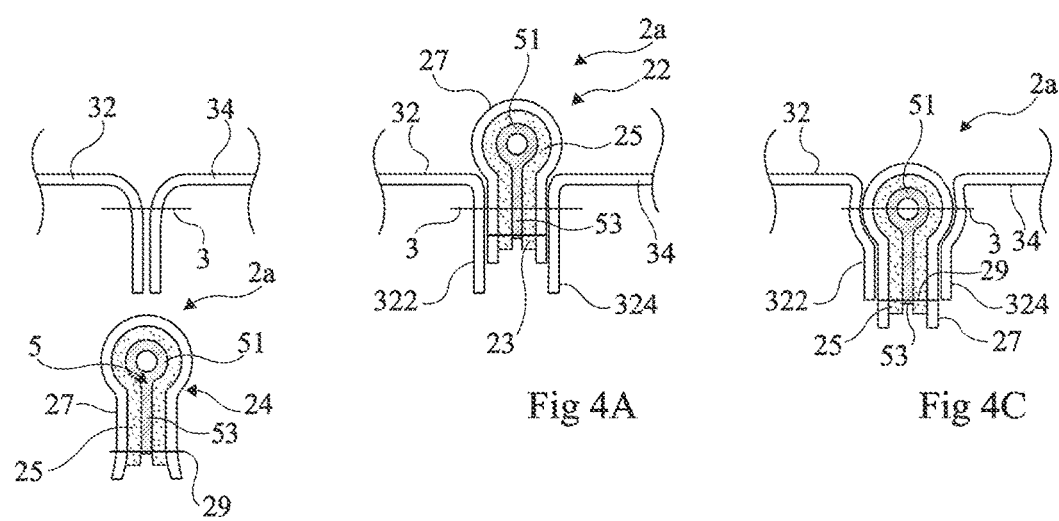
Fig 4A  Fig 4C
Fig 4B
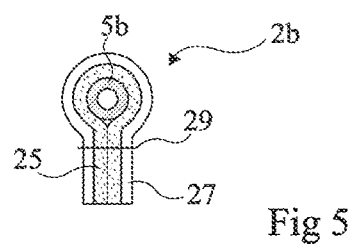
Fig 5

PIPING FOR A MOTOR VEHICLE COVER

The present patent application claims the priority benefit of French patent application FR14/55703, filed Jun. 30, 2014, the contents of which are incorporated herein by reference in its entirety to the maximum extent allowable by law.

BACKGROUND

The present disclosure generally relates to motor vehicle seats and, more specifically, to covers fitting such seats. The present disclosure relates to the forming of a decorative piping for a motor vehicle seat cover.

DISCUSSION OF THE RELATED ART

Motor vehicle seats are generally formed of a frame covered with upholstery. The upholstery is itself formed of a foam padding covered with a cover made of fabric, skin, leather, synthetic material, etc.

Most often, for aesthetic reasons, the external aspect of the seat bottom part, of the backrest, or of the head restraint is not uniform, and comprises different appearance elements. Among the aspect elements, certain seams of the cover are made more apparent by a piping which makes the seams and their pattern stand out. Such pipings are made of a rigid core surrounded with a cover element and extend all along a seam connecting two parts of a cover.

SUMMARY

An embodiment aims at providing a motor vehicle seat cover having an improved appearance.

An embodiment aims at providing a cover having a seam partially fitted with a piping.

An embodiment aims at providing a piping compatible with a curved seam.

Thus, an embodiment provides a motor vehicle seat cover comprising, at the level of an assembly between first and second parts, a piping assembled to said parts and having at least one first section above the cover and at least one second section masked by the cover.

According to an embodiment, the assembly is performed by sewing.

According to an embodiment, the piping comprises, in cross-section, a circular portion continued by a rectilinear portion.

According to an embodiment, the seam between the first and second parts crosses the circular portion of the piping at the interface between the first section and the second section(s).

According to an embodiment, in the first section, edges of the first and second parts are sewn to the rectilinear portion of the piping.

According to an embodiment, the piping comprises two second sections, one at each end of the first section.

According to an embodiment, the piping is or comprises a core made of plastic.

According to an embodiment, the core is surrounded with a third part, different from the first and second parts.

According to an embodiment, edges of the third part are assembled under the surface of the cover.

According to an embodiment, the two edges of the third part are assembled to a rectilinear portion of the core.

According to an embodiment, the third part comprises a foam layer and/or a transparent film and/or a layer of leather, skin, fabric, or synthetic material.

According to an embodiment, the materials forming the piping are selected to be capable of being sewn.

According to an embodiment, the first and second parts are made of leather, skin, fabric, or synthetic material.

An embodiment provides a motor vehicle seat element comprising a cover.

An embodiment provides a motor vehicle seat comprising a seat element.

The foregoing and other features and advantages will be discussed in detail in the following non-limiting description of specific embodiments in connection with the accompanying drawings.

BRIEF DESCRIPTION OF THE DRAWINGS

FIG. 1 is a simplified view of an embodiment of a motor vehicle seat;

FIG. 2 is a top view of two parts of a cover comprising a piping at the level of their seam;

FIG. 3 is a simplified side view of an embodiment of a cover at the level of a piping;

FIGS. 4A, 4B, and 4C are transverse views of the cover at the level of lines A, B, and C of FIG. 3;

FIG. 5 is a cross-section view of an alternative embodiment of a piping;

DETAILED DESCRIPTION

Figure 6:
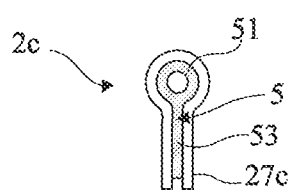
FIG. 6 is a cross-section view of another alternative embodiment of a piping.

For clarity, only those steps and elements which are useful to the understanding of the embodiments which will be described have been shown and will be detailed. In particular, the forming of the other seat elements, and particularly of the frame and of the padding, has not been detailed, the described embodiments being compatible with the usual forming of such elements.

It should be noted that, in the drawings, the structural and/or functional elements common to the different embodiments may be designated with the same reference numerals and may have identical structural, dimensional, and material properties.

In the following description, when reference is made to terms qualifying absolute positions, such as terms "front", "rear", "top", "bottom", "left", "right", etc., or relative positions, such as terms "above", "under", "upper", "lower", etc., or to terms qualifying directions, it is referred, unless otherwise mentioned to the orientation of the drawings or to a seat in its normal position of use.

FIG. 1 schematically and partially shows a motor vehicle seat 1. Such a seat is generally made of a seat bottom piece 12, having a backrest 14 hinged thereto and possibly topped with a head restraint 16. A frame of the seat bottom piece is affixed to the vehicle floor (not shown), for example, by a slide mechanism or by a hinge for a collapsible seat bottom piece.

FIG. 1 essentially illustrates the visible aspect of the seat, that is, the external aspect of its cover.

Usually, the cover is made of a plurality of parts sewn together. The parts may be made of leather, of skin, of woven or nonwoven fabric, of synthetic material, etc.

The seam lines between parts form the outer pattern of the cover and give it its style. The parts may have different colors, or even be made of different materials.

In the shown embodiment, backrest 14 and head restraint 16 each comprise a piping 2 protruding from the surface of the cover at the level of a seam. For example, for the backrest, piping 2 is provided in the seam between upper portion 142 of the cover and central portion 144 defining a backrest central portion. For head restraint 16, a piping 2 is provided between front portion 162 of the cover and upper portion 164. These are examples, and a piping may be provided at the level of any seam, including in the lateral or rear surfaces of the seat elements.

Unlike current pipings which extend all along a seam, the piping provided by the described embodiments preferably does not extend all the way to the edges of the cushion for which it is provided.

FIG. 2 is a top view of an embodiment of a piping 2 between two cover parts 32 and 34. As appears in the drawing, seam 3 of assembly between the two parts 32 and 34 is now above piping 2, now under. In other words, at least one (first) section 22 of the piping is above the cover and at least one (second) section (not shown in FIG. 2) is masked by the cover. Preferably, only a central section 22 of the piping comes out of the cover, the two end sections being inside of the cover.

FIG. 3 is a side view of piping 2 of FIG. 2.

As indicated hereabove, piping 2 comprises a section 22 outside of the cover, that is, above the plane or the general apparent surface of the cover and, in this example, two sections 24 on either side of section 22.

In the embodiment illustrated in FIG. 3, piping 2 comprises a portion 41 having a circular cross-section and a portion 43 having a straight cross-section. The portion having a straight or vertical cross-section remains, at least partly, under the cover, that is, under seam 3.

FIGS. 4A, 4B, and 4C are cross-section views of an embodiment of a piping 2a, respectively along lines A, B, and C of FIG. 3.

Piping 2a comprises a core 5, for example, made in the form of a plastic profile. Core 5 for example comprises a portion having a circular cross-section (for example, but non-necessarily, hollow at its center) and a portion or foot 53 having a rectilinear cross-section. A foam layer 25 surrounds the plastic core and a coating material 27 covers this foam layer or directly covers core 51 in the absence of a foam layer. The coating material may be a simple transparent plastic film (for example, marked with a logo, a pattern, etc.), a part made of leather, skin, fabric, synthetic material, etc. according to the desired appearance.

Piping 2a is pre-assembled, that is, a third part comprising coating 27 and, possibly, foam 25, are assembled by having, for example, their edges sewn (seam 29) at foot 53 of core 5. The part coating core 5 thus has an elongated shape and is independent from parts 32 and 34 of the cover.

In FIGS. 4A to 4C, to highlight the different elements 5, 25, and 27 forming piping 2a, these elements have been shown with different dimensions. This is however not indispensable.

FIG. 4A illustrates the aspect of the cover at the level of section 22. Piping 2a protrudes from the surface of the cover having its parts 32 and 34 reaching the level of foot 53. Portion 41 of circular cross-section of the piping is located outside of the cover. Seam 3 catches respective edges 322 and 324 of parts 32 and 34 and crosses foot 53. Parts 32 and 34 are thus sewn under portion 41 of circular cross-section of piping 2a.

FIG. 4B illustrates the aspect of the cover at the level of a section 24. Here again, it shows the outlook of a direct sewing of edges 322 and 324 of two cover parts 32 and 34 together.

FIG. 4C illustrates the aspect of the cover at the interface between sections 22 and 24, that is, when portion 41 of circular cross-section passes from above the cover to under it. A specificity is that seam 3 is not interrupted between sections 22 and 24. In other words, at the interface between sections 22 and 24, seam 3 crosses circular portion 51 of core 5 of the piping.

The plastic material forming the core of piping 2a is thus selected to be capable of being sewn. It is thus not too rigid to avoid breaking under the effect of the needle during the sewing.

Figure 7:
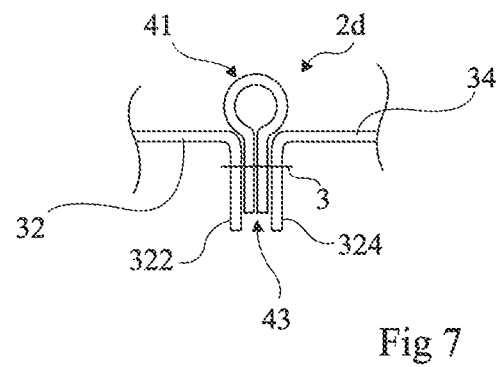
FIG. 7 is a cross-section view of still another alternative embodiment of a piping.

FIGS. 5, 6, and 7 are cross-section views of pipings 2b, 2c, and 2d illustrating alternative embodiments.

In FIG. 5, piping 2b comprises a plastic core 5b, of circular cross-section, having no foot or rectilinear portion. In the example of FIG. 5, the third part comprises, as in FIGS. 4A to 4C, a foam layer 25 and a coating 27. The two edges of the third part are directly assembled to each other, for example, by being sewn, glued, or molten.

In FIG. 6, piping 2c comprises a plastic core 5 coated with a transparent film 27c and comprising no foam layer.

In FIG. 7, piping 2d is made one piece of material, for example, plastic, capable of being sewn. For example, piping 2d is, in cross-section, formed of a part folded on itself to define circular portion 41 and rectilinear portion 43. FIG. 7 shows parts 32 and 34 as in FIG. 4A.

The dimensions of piping 2 depend on the desired effect. These dimensions are however selected to be compatible with the forming of a seam, not only at the foot, but also at the level of the portion having a circular cross-section.

As a specific embodiment, plastic core 5 or piping 2d has, in cross-section, a height in the range from less than 1 cm (for example, approximately 0.8 cm) to a few centimeters (for example, approximately 3 cm). Portion 51 or 41 of circular cross-section for example has a diameter in the range from 4 mm to 1 cm. Portion 53 or 43 of rectilinear cross-section for example has a height in the range from 4 mm to 2 cm.

An advantage of the described embodiments is that it is now possible to give a seat cover an aesthetic appearance by means of pipings which do not extend all along a seam line.

Another advantage is that the formed cover is compatible with usual paddings. In particular, it requires no modification of the padding whereon the cover should be placed (slipped).

It should be noted that the flexibility of the piping enabling it to pass under the cover also allows it to follow a curved seam line pattern.

What has been described in relation with an example applied to a seat backrest or head restraint of course applies to any motor vehicle seat element, and thus to a seat bottom piece. Further, the materials forming the parts assembled to form the cover may differ according to the seat areas.

Various embodiments have been described. Various alterations, modifications, and improvements will occur to those skilled in the art. In particular, the dimensions of the piping may vary according to embodiments. For example, a piping alternatively running over and under the cover and then comprising a plurality of first sections and more than two second sections may be provided. According to another variation, intended for the case where the piping stops at the cover edge, one of its ends does not pass under the cover, the piping then only comprises one second section at one end of a first section. Further, although an assembly by sewing is a preferred embodiment, it may be provided to assemble the parts by gluing of the part edges together or by melting (in the case of synthetic materials). Further, the cover parts may be coated at their rear surface with a foam layer. Finally, the practical implementation of the described embodiments is within the abilities of those skilled in the art based on the functional indications given hereabove, be it for sewing techniques or for piping-forming techniques.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A motor vehicle seat cover comprising:
   a first part;
   a second part; and
   a piping having a circular cross-sectional portion, wherein a first section of the piping is assembled to the first and second parts, wherein the circular cross-sectional portion of at least a second section of the piping is below the first and second parts, and wherein the first and second parts are directly assembled above the circular cross-sectional portion of the second section of piping.

2. The cover of claim 1, wherein the assembly is performed by sewing.

3. The cover of claim 1, wherein the piping comprises, in cross-section, the circular portion continued by a rectilinear portion.

4. The cover of claim 3, wherein the assembly is performed by sewing and wherein the sewing of the first and of the second parts crosses the circular portion of the piping at the interface between the first section of the piping and the second section of the piping.

5. The cover of claim 4, wherein, in the first section of the piping, edges of the first and second parts are sewn to the rectilinear portion of the piping.

6. The cover of claim 1, wherein the piping has a third section of the piping, the second section of the piping and the third section of the piping at each end of the first section of the piping.

7. The cover of claim 1, wherein the piping is or comprises a core made of plastic.

8. The cover of claim 7, wherein the core is surrounded with a third part, different from the first and second parts.

9. The cover of claim 8, wherein edges of the third part are assembled under the cover surface.

10. The cover of claim 9, wherein the piping comprises, in cross-section, the circular portion continued by a rectilinear portion and wherein the two edges of the third part are assembled to a rectilinear portion of the core.

11. The cover of claim 8, wherein the third part comprises a foam layer, a transparent film, a layer of leather, skin, fabric, or synthetic material, or any combination thereof.

12. The cover of claim 1, wherein the piping is formed of one or more materials, each of the one or more materials capable of being sewn.

13. The cover of claim 1, wherein the first and second parts are made of leather, skin, fabric, or synthetic material.

14. A motor vehicle seat element comprising the cover of claim 1.

15. A motor vehicle seat comprising the seat element of claim 14.

* * * * *